(12) United States Patent
McClure et al.

(10) Patent No.: US 6,711,501 B2
(45) Date of Patent: Mar. 23, 2004

(54) VEHICLE NAVIGATION SYSTEM AND METHOD FOR SWATHING APPLICATIONS

(75) Inventors: John A. McClure, Scottsdale, AZ (US); Dennis M. Collins, Gilbert, AZ (US); Richard W. Heiniger, Parkville, MO (US)

(73) Assignee: Satloc, LLC, Scottsdale, AZ (US)

( * ) Notice: Subject to any disclaimer, the term of this patent is extended or adjusted under 35 U.S.C. 154(b) by 0 days.

(21) Appl. No.: 10/396,788

(22) Filed: Mar. 25, 2003

(65) Prior Publication Data

US 2003/0187577 A1 Oct. 2, 2003

Related U.S. Application Data

(63) Continuation-in-part of application No. 09/733,641, filed on Dec. 8, 2000, now Pat. No. 6,539,303.

(51) Int. Cl.[7] .................................................. G06F 7/00
(52) U.S. Cl. ........................ 701/213; 701/200; 701/50; 340/588; 340/990; 73/178 R
(58) Field of Search ............................ 701/213, 50, 49, 701/207, 209, 211, 36, 1, 200; 340/988, 990; 73/178 R

(56) References Cited

U.S. PATENT DOCUMENTS

| | | | |
|---|---|---|---|
| 5,644,139 A | * | 7/1997 | Allen et al. .................. 250/557 |
| 6,389,345 B2 | * | 5/2002 | Phelps ........................ 701/50 |
| 6,539,303 B2 | * | 3/2003 | McClure et al. ............. 701/213 |

* cited by examiner

Primary Examiner—William A. Cuchlinski, Jr.
Assistant Examiner—Olga Hernandez
(74) Attorney, Agent, or Firm—Mark E. Brown

(57) ABSTRACT

A swathing guidance system includes a controller storing data defining a desired vehicle path, a position detector subsystem such as a differential GPS receiver, and a display to graphically display current spatial parameters and corrective steering actions to place the vehicle on the desired path or to maintain it on the path. The controller periodically selects a future intercept point on the path and calculates a steering correction angle to point the vehicle toward the intercept point. The display includes a steering guide which displays the steering correction angle relative to the current heading and the current track error or distance from the desired path. The steering correction angle can alternatively be applied to an automatic steering mechanism to automatically maintain the vehicle on the desired path. In agricultural applications, the system is applicable to both parallel and contour cultivation modes.

23 Claims, 11 Drawing Sheets

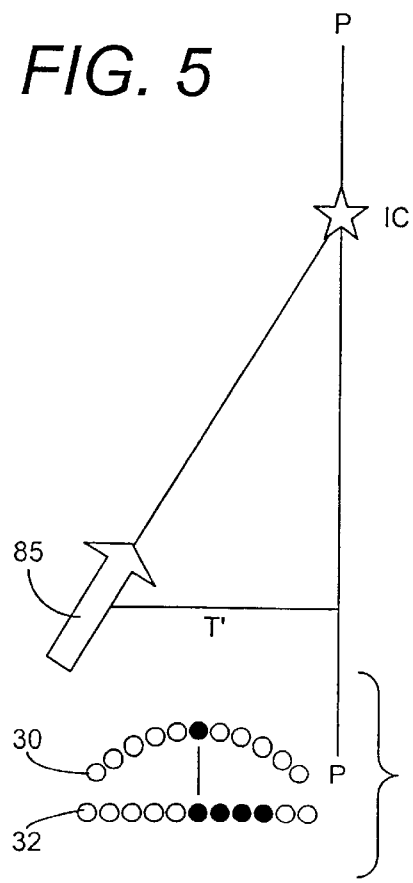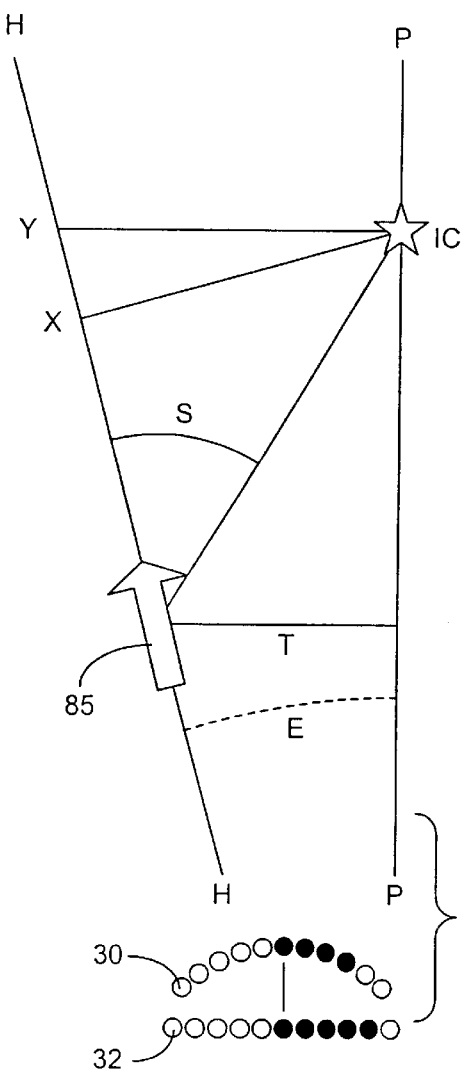
FIG. 4
FIG. 5

VEHICLE NAVIGATION SYSTEM AND METHOD FOR SWATHING APPLICATIONS

CROSS-REFERENCE TO RELATED APPLICATION

This application is a continuation-in-part of U.S. patent application Ser. No. 09/733,641 filed on Dec. 8, 2000, now U.S. Pat. No. 6,539,303, issued Mar. 25, 2003.

BACKGROUND OF THE INVENTION

The present invention relates to the area of agricultural soil working and product application and, more particularly, to a guidance system and display to enable optimally driving swaths in rectangular fields, where parallel swathing is most efficient, and odd shaped fields, where contour swathing is more desirably employed.

As agricultural tractors have increased in size and horsepower, agricultural implements for cultivating soil and for applying treatment products, such as fertilizers, herbicides, insecticides, or the like, to soil and crops have also progressed from those which worked a single crop row to those which may work tens of rows simultaneously. The reasons for such growth in agricultural equipment include efforts to increase productivity through increases in fuel efficiency and decreases in time required to work a given field. Thus, it is advantageous to combine numerous agricultural operations per pass and to maximize the swath or soil working path width per pass. Another factor which affects productivity is crop yield per unit of field area. For this reason, it is desirable to maximize the percentage of arable land which is cultivated by avoiding gaps. At the same time, it is desirable to avoid overlapping cultivation which wastes resources.

The cultivation of long straight, or parallel, crop rows is generally preferred since long rows minimize the number of turnarounds at the ends of rows, and parallel rows are relatively easy to drive accurately by the tractor operator. Flat fields with straight boundaries are especially suited to parallel crop rows. Fields with a more "hilly" character benefit from contour plowing in which the crop rows extend generally perpendicular to the gradient of the ground surface. Contour rows maximize moisture retention and minimize soil erosion. Also, contour rows are sometimes preferred for fields with irregular boundaries.

Parallel rows are easier to cultivate than contoured rows, and crop rows are more accurately worked with a narrow implement frame than a wide frame. In order to increase accuracy in cultivation, various practices have evolved to avoid gaps in cultivation and overlapping cultivation. Earliest practices included marking the edge of a "swath" in which an inert marking material is deposited during one pass from one extremity of the tool frame. On the next pass, the operator would attempt to align an outer extremity of the frame with the previously marked line. Although generally successful, marking methods involve an additional expense for the marking material and additionally the need to monitor the amount of marking material on-board and replenish when exhausted.

More recently, cultivation or swathing guidance has incorporated position data derived from satellite based global positioning systems. With current enhancements to the original GPS system, spatial resolutions of less than a meter are now possible. In general, GPS techniques have been applied to swath guidance in such a manner as to store data defining a desired path, detect current position and sometimes heading, calculate a position offset or heading error, and display a complement or opposite of the error to thereby guide the operator in maintaining the desired path or returning to the desired path. In practice, it has been found that such an approach tends to cause the operator to overshoot the correction, resulting in oscillation about the desired path. Such overshooting and oscillation is also found in application of an error signal in such a manner to an automatic steering mechanism. What is needed is a position detecting guidance approach which tends to lead the vehicle back onto the correct path without overshoot. Such a guidance method should also be applicable to both parallel cultivation as well as contour cultivation.

BRIEF DESCRIPTION OF THE INVENTION

The present invention provides an improved system for vehicle guidance which is particularly well adapted for use in swathing guidance. The present invention includes a position detecting subsystem which provides data defining a currently detected position and a guidance controller which stores the positions detected by the position detecting system and is programmed with routines for generating and storing data defining a reference path and a current path, for calculating current speed and heading and an error in the current position, and for calculating a correction in heading to most expeditiously return the vehicle to the correct current path.

More specifically, the present invention repeatedly selects a future intercept point on the desired path and calculates a heading correction to cause the vehicle to move toward the intercept point. The cycle of selecting a new intercept point and heading correction is updated often enough to cause the vehicle, if off-track, to "flare" into the desired path. If the vehicle is already on the desired path or on a heading directly toward the intercept point, the method causes the vehicle to remain on the current heading.

In one embodiment of the invention, the apparatus includes a display including an arcuate array of steering indicators forming a steering guide along with a linear array of current position indicators to show relative distance and sense, or relative direction, from the desired path. In another embodiment of the present invention, a steering correction signal is applied to an automatic steering mechanism on the vehicle to automatically correct or maintain the vehicle on the desired path.

Another embodiment of the invention uses two straight LED arrays for the steering error and cross track displays and seven-segment or alphanumeric displays for the menu and remote user entry through switches or a keypad. The present invention makes use of automatic position detection technologies, preferably including a satellite based global positioning system, such as the United States developed Navstar system, and enhancements thereof. Current versions of differential GPS systems are known to have accuracies within less than one meter. Additionally, other types of position reckoning systems are known, such as those employing various kinds of odometers and rotation encoders, laser devices, and the like, as well as conventional swath marking systems. The present invention contemplates incorporation of such other positioning determining systems within the novel methods described herein.

Further embodiments of the invention include GPS database management, automatic steering mechanism components retrofit with existing vehicle steering components, previously-covered area detection and area management features.

OBJECTS AND ADVANTAGES OF THE INVENTION

The principal objects of the present invention are: to provide an improved system for vehicle guidance; to provide such a system which employs position detecting technique, such as by reception of signals from a satellite based global positioning system; to provide such a system which is particularly well adapted for ground working vehicle, such as agricultural vehicles for soil working, fertilizing, spraying, irrigating, harvesting, and the like; to provide such a system which minimizes gaps and overlaps in crop cultivation; to provide such a system which calculates data-defining desired paths of the vehicle, monitors the current) position of the vehicle in relation to a desired path, and generates a steering correction signal to maintain the vehicle on the path or to return the vehicle to the path; to provide such a system into which the implement width can be entered to enable calculation of the desired paths for the vehicle to follow; to provide such a system including a display device responsive to the steering correction signal for displaying a needed steering correction for manual steering control; to provide such a system in which the steering correction signal is applied to an automatic steering mechanism; to provide such a system which minimizes overshoot in correcting the track of the vehicle to the desired path; to provide, particularly, a system which repeatedly selects a future intercept point and generates the steering correction signal to cause the vehicle to move toward the intercept point; to provide such a system which is adapted for guidance during parallel swathing and additionally for contour swathing; to provide such a system which can be conveniently retrofitted to existing tractors and vehicles; to provide such a system which can track and store data defining portions of a field worked, allowing an operator to resume accurate working of a field following an interruption; and to provide such a system which is economical to manufacture, which is accurate and efficient in operation, and which is particularly well adapted for its intended purpose.

Other objects and advantages of this invention will become apparent from the following description taken in relation to the accompanying drawings wherein are set forth, by way of illustration and example, certain embodiments of this invention. The drawings constitute a part of this specification, include exemplary embodiments of the present invention, and illustrate various objects and features thereof.

BRIEF DESCRIPTION OF THE DRAWINGS

The drawings constitute a part of this specification and include exemplary embodiments of the present invention and illustrate various objects and features thereof.

FIGS. 4, 5, and 6 are geometric diagrams illustrating application of the methods of the present invention to returning a vehicle to a desired path.

DETAILED DESCRIPTION OF THE INVENTION

I. Introduction

Figure 1:
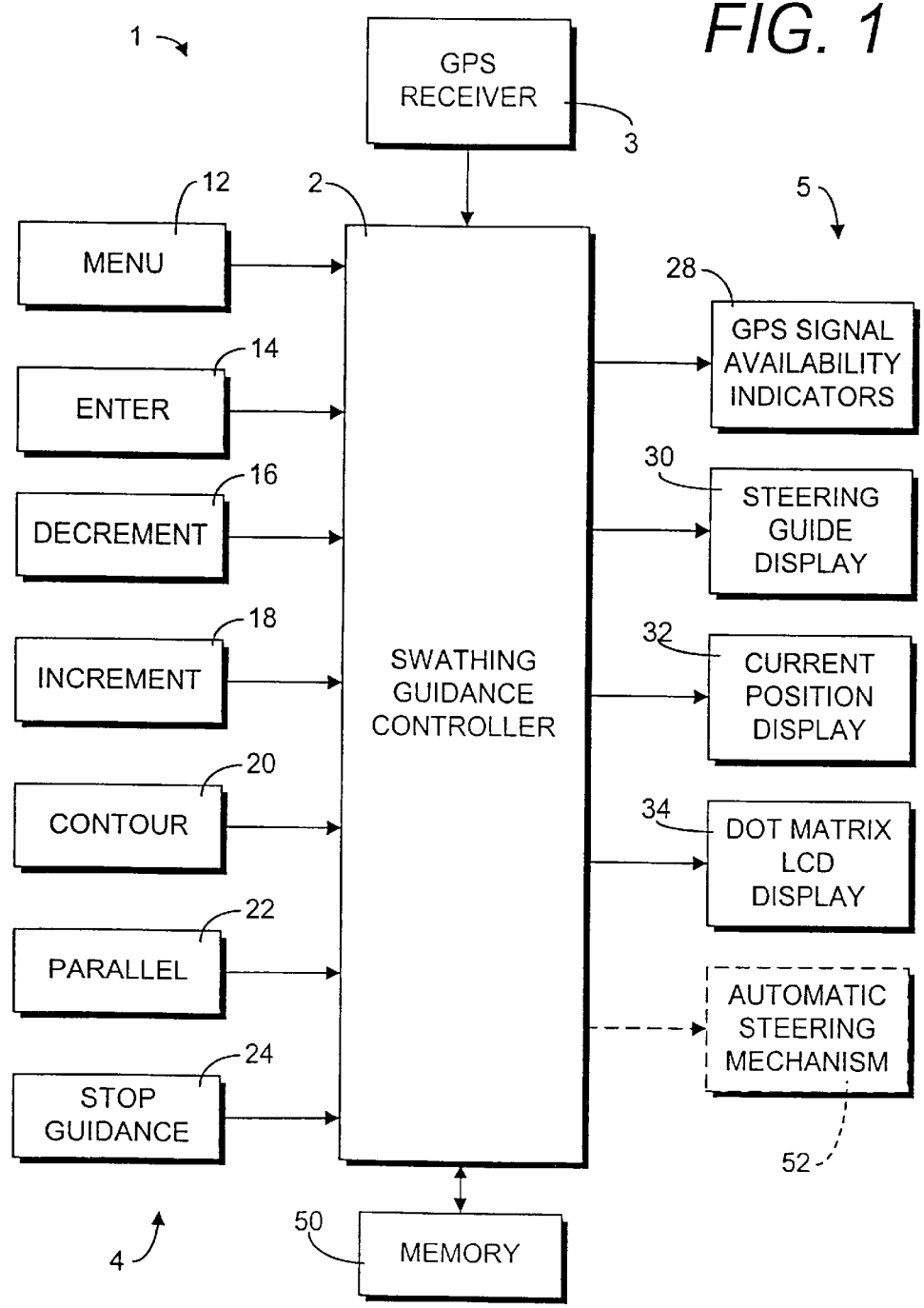
FIG. 1 is a block diagram illustrating a swathing guidance system which embodies the present invention.

As required, detailed embodiments and/or aspects of the present invention are disclosed herein; however, it is to be understood that the disclosed embodiments/aspects are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates a GPS derived swathing guidance system which embodies the present invention. The system 1 generally includes a swathing guidance controller or computer 2 and a position detector device such as a global positioning system receiver 3. The controller 2 stores program routines which receive settings and inputs from switches 4 and causes the display of information on the output display devices 5. In particular, the controller 2 cooperates with the GPS receiver 3 to store detected positions and to determine the extent and direction of position or path discrepancy and causes the display of data for corrective movement on the displays 5.

Figure 2:
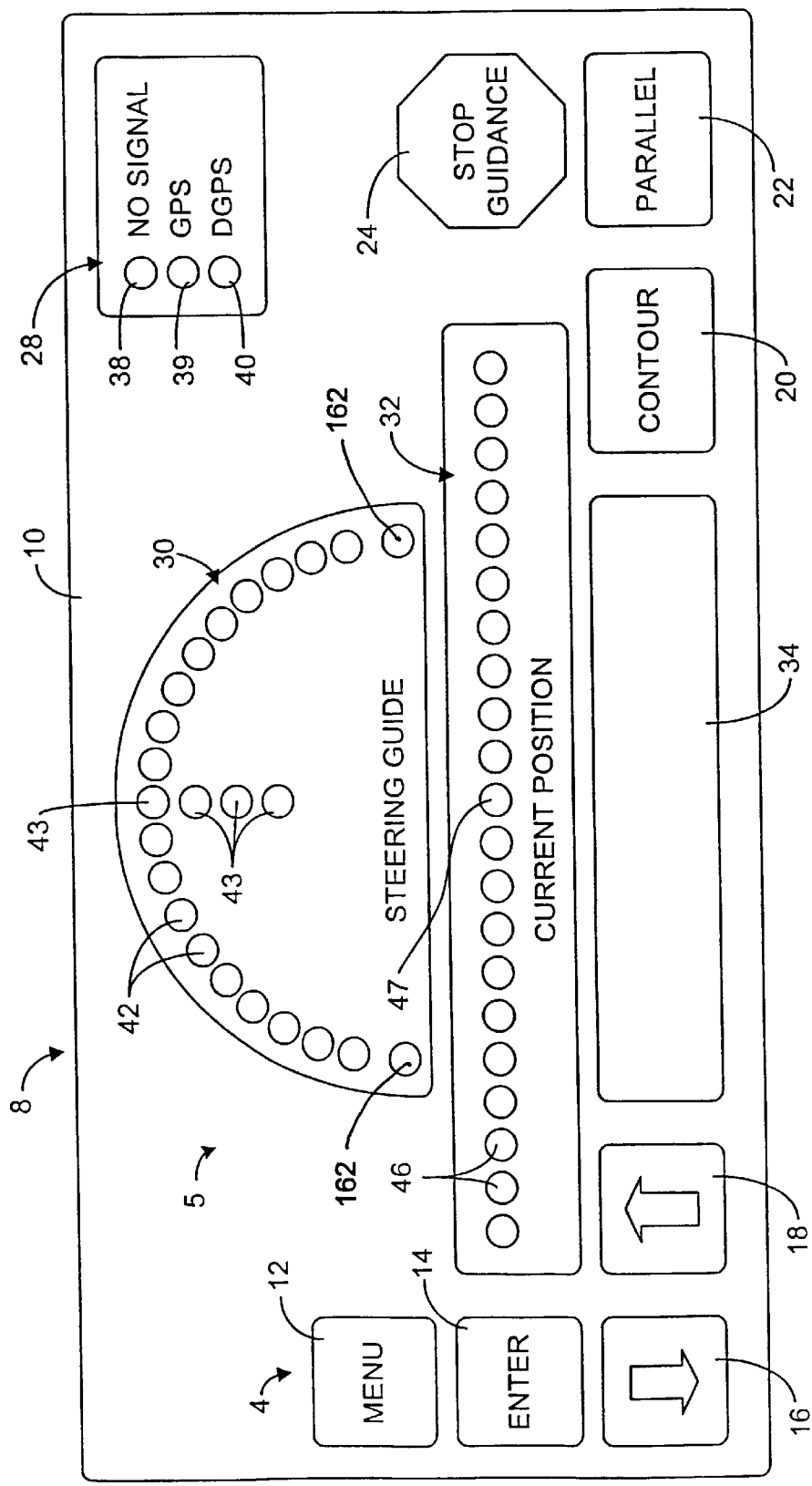
FIG. 2 is an elevational view of an exemplary swathing guidance system unit by which the present invention is implemented.

FIG. 2 illustrates an exemplary swathing guidance unit 8 which comprises most of the components of the system 1, including the input switches 4 and the displays 5. In particular, the unit includes a base panel 10 on which the input switches 4 and the displays 5 are mounted. The illustrated switches 4 include a menu switch 12, an enter or execute switch 14, a decrement or down switch 16, an increment or up switch 18, a contour mode switch 20, a parallel mode switch 22, and a stop guidance switch 24. The displays 5 include a GPS signal quality display 28, a steering guide display 30, a current position display 32, and a menu display 34. The guidance controller 2 may be incorporated into the guidance unit 8 or may be a separate module which is plugged into the unit 8. Similarly, the GPS receiver 3 may be built into the guidance unit 8 or may be implemented as a separate unit which can be mounted on an agricultural vehicle to optimize the position of an antenna or antennas (not shown) of the receiver 3. In such a case, the GPS receiver 3 would be connected to the controller 2 by a cable.

The switches 4 may be formed as membrane switches which have high reliability in agricultural environments which can include high levels of dust and extremes of temperatures. The GPS indicators 28 and the indicators of the steering guide display 30 and the current position display 32 may be light emitting diodes (LED's) or fluorescent displays. GPS receivers typically must receive signals from at least four GPS satellites in order to calculate the current coarse position. The receiver 3 must also receive a signal from a differential GPS transmitter in order to calculate the needed fine position possible with differential GPS technologies. The differential correction signals can come from satellite or ground based sources, including C and L band satellites, 300 KHz beacon towers, VHF or UHF radio links, and cell phone or internet based communication systems. The GPS signal quality display 28 indicates the quality of GPS signal which is currently being received. The illustrated GPS signal quality display 28 includes a "no signal" indicator 38, a GPS indicator 39, and a DGPS (differential GPS) indicator 40, which may differently colored to indicate function. Alternatively, single multi-colored indicator could be employed for the signal quality display 28. The no-signal indicator 38 is activated when an insufficient number of GPS satellites are "visible" to the GPS receiver 3. The GPS indicator 39 indicates coarse GPS functioning, while the DGPS indicator 40 indicates full differential GPS signal acquisition.

The illustrated steering guide display 30 includes a semi-circular or arcuate array of steering guide indicators 42 which, when activated, indicate a steering correction angle to place the guided vehicle on the desired path. The steering guide display 30 also includes a line of current heading indicators 43 which are centered on the steering guide 30 and form a reference for the steering correction angle to graphically display a steering or turn correction angle. Although not illustrated, the steering guide display 30 may include angled lines converging at an origin or center of the display 30 to aid a vehicle operator in reading the steering guide display 30. The current heading indicators 43 may be a different color than the remaining steering guide indicators 42 for visual contrast.

The illustrated current position display 32 is formed by a linear array of position indicators 46 including a centered, current position indicator 47. At least one of the position indicators 46 is activated, along with the current position indicator 47, to indicate the relative distance of a guided vehicle from the desired path and the relative direction therefrom, that is, to the left or right of the current position. The current position indicator 47 is preferably of a different color than the remaining position indicators. The display indicators 38–40, 42, 43, 46, and 47 may be light emitting diodes or fluorescent displays. It is foreseen that the steering guide 30 and current position display 32 could, alternatively, be implemented as analog meters, graphic displays on a conventional cathode ray tube (CRT) or liquid crystal display (LCD) monitor, or as a proprietary LCD display showing angularly arrayed regions for the steering guide display 30 and linearly arrayed functions for the current position display 32. The steering guide 30 and current position display 32 could, alternatively, be implemented as respective linear arrays of indicators, as shown in an alternative display unit 33 (FIG. 8) which will be described further below.

The illustrated menu display 34 is preferably a dot matrix LCD display with a capacity for displaying several lines of multiple characters. The menu display 34 operates in cooperation with the switches 4 to enable a vehicle operator to select programmed functions of the system 1, to enter data, such as implement width, and to generally control operation of the system 1. An operating program for the system 1 is stored in memory 50 which is interfaced to the controller 2. The memory 50 may include a combination of read only memory (ROM), non-volatile read/write memory (RAM), and volatile RAM. The program menu is entered by operation of the menu switch 12. The down and up switches 16 and 18 are used to step or scroll through the menu selections. The enter switch 14 is used to select a function displayed on the menu display 34. The contour and parallel switches 20 and 22 are used to enter respective contour and parallel guidance modes. The stop guidance 24 is used to exit a guidance mode. The menu display 34 may also be used in cooperation with the steering guide display 30 and current position display 32 to display numeric values of the heading and position information graphically displayed by the steering display 30 and the position display 32.

The system 1 is principally described with reference to a steering correction angle which is displayed on the steering guide display 30. However, it is foreseen that a steering correction angle which is calculated by the controller 2 could also be applied to an automatic steering mechanism 52 (FIG. 1), such as a mechanism incorporating hydraulic or electromotive elements to steer a vehicle guided by the system 1. Such an automatic steering mechanism 52, controlled by the system 1 of the present invention, would be advantageous in agricultural applications as well as non-agricultural applications. In an agricultural application, such an automatic steering mechanism 52 could be used, even with an operator present, to reduce operator fatigue. Alternatively, some entirely unattended applications are envisioned.

Figure 3:
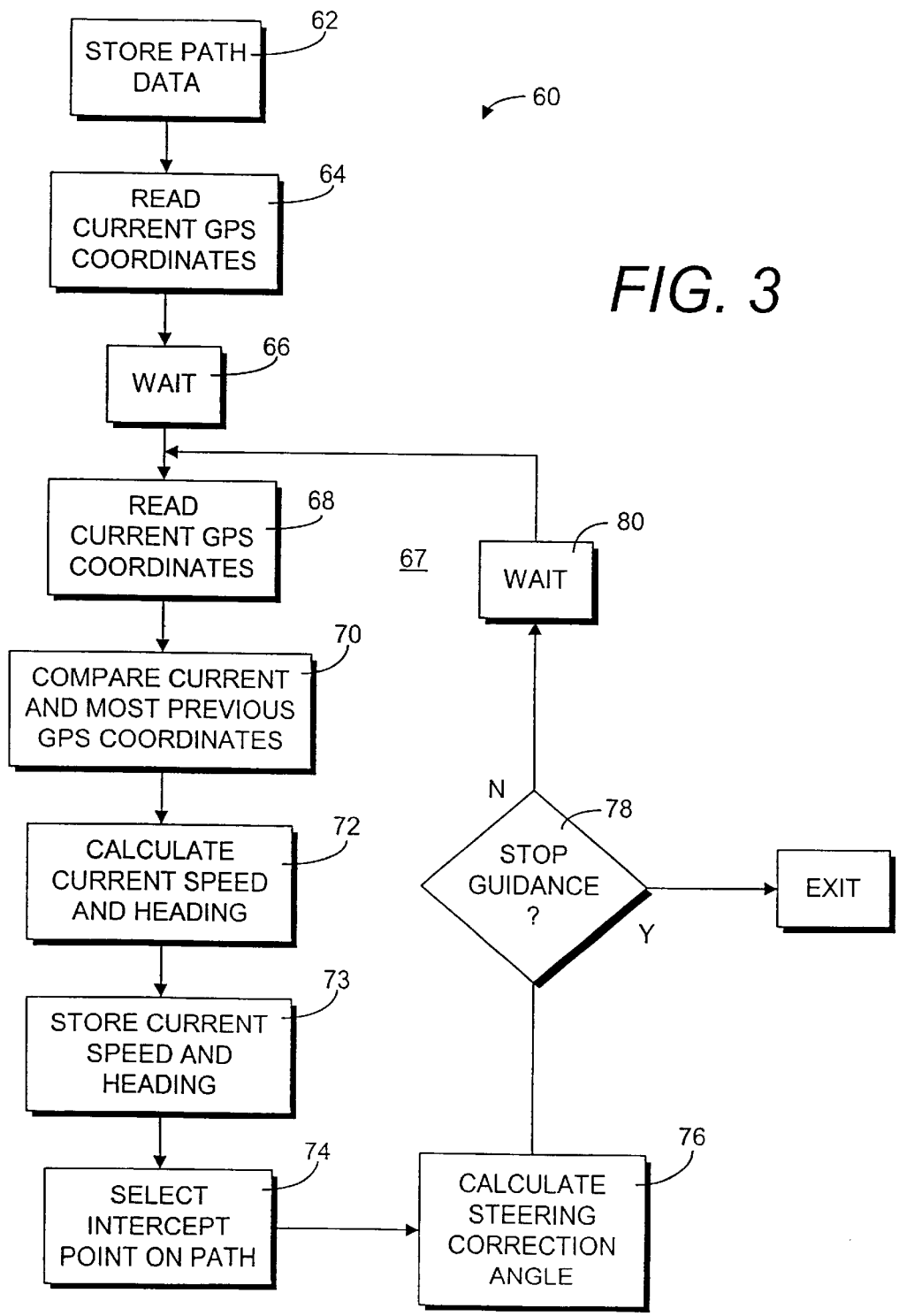
FIG. 3 is a flow diagram illustrating the principal steps of a swathing guidance method which embodies the present invention.

FIG. 3 illustrates principal steps of a swathing guidance method 60 according to the present invention. The method 60 includes storing data defining a desired path for the guided vehicle at 62. The method of characterizing a desired path varies depending on whether a parallel mode or a contour mode has been set by operation of the switches 22 or 20. In the parallel mode of operation, GPS position readings are taken at a beginning point and an end point of a reference line or path. The width of the cultivation implement drawn by the guided vehicle is entered by way of the menu and arrow switches 12, 16, and 18. Using known geometric and trigonometric relationships, the controller 2 can then calculate a plurality of paths parallel to the reference line, on-the-fly during operation. Alternatively, the controller 2 can calculate the paths and store them in the memory 50. Contour mode operation is somewhat different. In the contour mode, the guided vehicle is driven along a desired contour path with the GPS receiver 3 providing periodic position readings which are stored in the memory 50. The controller 2 can be programmed to detect when a second pass is begun which comes within a selected proximity, such as a multiple of the implement width previously entered. As each pass is driven, data describing the pass is added to the reference data for the next pass.

Referring to FIG. 3, once a reference path has been\stored and a current path calculated, an initial GPS reading is taken at 64 and after a wait or time out 66, enters a steering correction loop 67. Each steering correction loop includes an additional GPS reading at 68, followed by a comparison step 70 which compares position data from current and previous readings by the controller 2, a calculation step 72 in which the current speed and heading of the guided vehicle are calculated, and a store step 73 in which the current speed and heading are stored in the memory 50. The controller 2 selects a future intercept point on the stored or projected path at 74, based on the current:,ground speed of the guided vehicle. The distance to the intercept point is selected to quickly lead the guided vehicle back onto the desired path with minimal overshoot. If the intercept point is at too great a distance, the system 1 will not detect mall steering errors. However, if the intercept distance s too small, the steering guide display 30 might become erratic and difficult to read. Once the intercept point is selected, the controller 2 calculates a steering correction angle at 76 to point the guided vehicle toward the intercept point. Unless operation of the stop guidance switch 24 is detected at 78, the steering correction loop 67 repeats after a timed wait 80. This timed wait is the time until a new GPS position is received from the GPS receiver 3, which typically occurs, in the system 1, every 0.2 seconds. Thus, he GPS receiver 3 and controller 2 preferably have adequate throughput to repeat the steering correction loop 67 lumerous times per second, such as five times per second.

The steering correction angle calculated at 76 is used to generate a "steering correction signal" with a parameter proportional to the steering correction angle. The steering correction angle is scaled to the angular resolution of the steering guide display 30 so that steering indicators 42 and 3 are activated to represent the steering correction angle s accurately as possible. Additionally, the controller 2 calculates a distance of the current position from the nearest position on the desired path as a current position signal and displays a relative distance and relative direction (left or right) to the desired path by activation of a generally proportional number of position indicators 46 and 47. Because of the high update rate of the steering correction loop 67, the controller 2 preferably exercises some "update smoothing" techniques to thereby smooth out updates to the indicators of the displays 30 and 32 over time to thereby increase usability of the displays 30 and 32. If the steering correction signal is applied to an automatic steering mechanism 52, some update smoothing techniques may also be desirable to avoid erratic operation of the steering mechanism 52.

Figure 6:
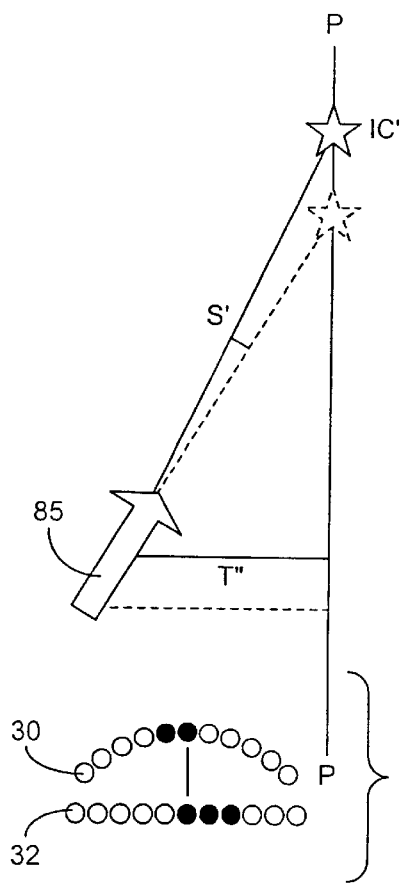

FIGS. 4–6 diagrammatically illustrate use of the system 1 and methods of the present invention to correct the heading of a guided vehicle 85, represented by an arrow. Relative distances and angles in FIGS. 4–6 are exaggerated for explanatory purposes. Line PP represents the desired path and HH the current heading. T is the track error or the perpendicular or closest distance of the vehicle 85 from the path PP. It should be noted that although the path PP is shown vertically in FIGS. 4–6, possibly appearing to imply a south to north path as on conventional maps, no such restriction in path direction is intended. The controller 2 selects an intercept point IC on the path PP and calculates a steering correction angle S to point the vehicle 85 toward the intercept point IC. In FIG. 4, the steering guide display 30 and position display 32 have respective indicators activated (illustrated as blackened) to display the steering correction angle 5 and the position error T.

It should be noted that the steering guide display 30 in the system 1 displays the correction angle, not the steering error angle E. The steering error angle E is the angular relationship between the current heading HH and the desired path PP.

It should be noted that the steering correction quantity may be calculated in units other than 5 angular units. Referring to FIG. 4, line X-IC is perpendicular to line HH, and line Y-IC is perpendicular to line PP. Lines X-IC and Y-IC are alternative ways of determining a "future crosstrack error", either by referencing to the current heading HH (X-IC) or to the desired path PP (Y-IC). By trigonometric identities, both lines X-IC and Y-IC are proportional in length to angle 5, for a given distance between the vehicle 85 and IC. Thus, the required steering correction can be calculated in length units instead of angular units.

FIG. 5 shows the vehicle 85 reoriented toward the intercept point IC in response to the displayed steering correction angle, resulting in no steering correction angle shown on the steering guide display 30. The track or position error in FIG. 5 has diminished to T'.

FIG. 6 shows the vehicle 85 at a somewhat later time as it has moved along the new heading from FIG. 5, such that the position error has reduced to T/. The controller 2 and the method 60 have selected a new intercept point IC' on path PP and calculated a new steering correction angle S'. However, the steering correction angle S' is now to the left as viewed and as indicated on the steering guide 30. The current position display 32 indicates that the position error T'" has been reduced from that detected in FIGS. 4 and 5.

Figure 7:
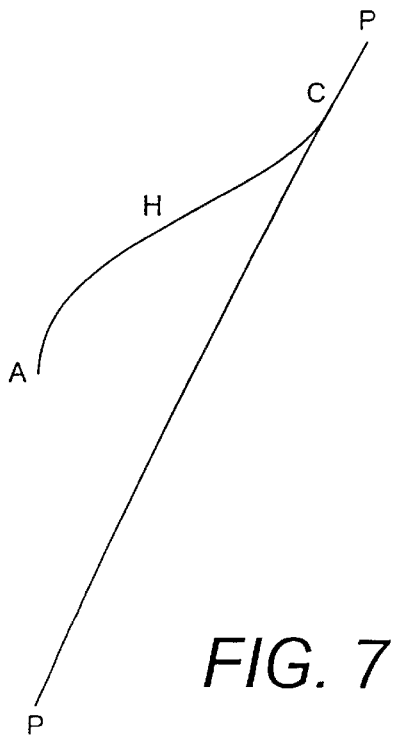
FIG. 7 is a simplified geometric diagram illustrating a flared return of a vehicle to a desired path by use of the present invention.

FIG. 7 graphically illustrates, with some spatial exaggeration, the desired corrective effect of the system 1 and method 60. The selection of the intercept points and calculation of the corresponding steering correction angles leads the vehicle 85 from an error point A along corrective heading path H to a convergence with a generalized path PP at C, with minimal overshoot.

Figure 8:
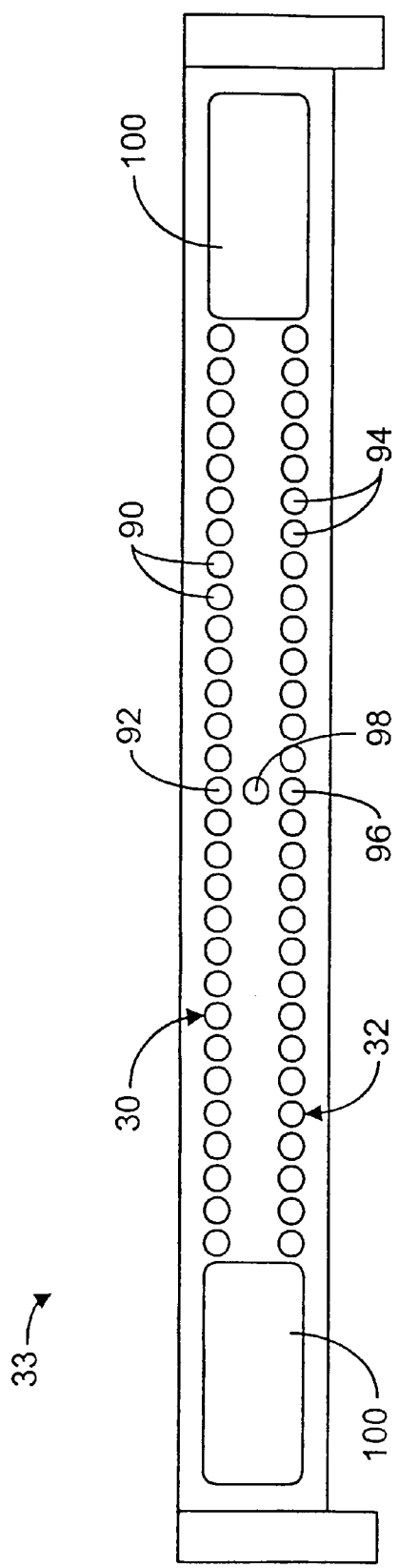
FIG. 8 is an elevational view of an alternative display unit for use in the swathing guidance system of the present invention and incorporating linear arrays of indicators for both a steering guide display and a current position display.

FIG. 8 illustrates an alternative embodiment of an display unit 33 which includes a steering guide display 30 and a current position display 32, formed by respective linear arrays of indicators. Specifically, the steering guide display 30 is formed by steering indicators 90, including a centered current heading indicator 92. In a like manner, the current position display 32 is formed by position indicators 94, including a centered current position indicator 96. The steering guide display 30 may include a centered index indicator 98 to visually emphasize the center of the display unit 33. The illustrated display unit 33 also includes auxiliary displays 100 which may be seven segment displays, alphanumeric displays, or dot-matrix arrays. The displays 30, 32, and 100 are interfaced to the guidance controller 2 and receive activation signals therefrom. The auxiliary displays 100 are used in cooperation with switches 4 to select menu functions of the controller 2. The steering guide display 30 and the current position display 32 of the display unit 33 function in a manner similar to the corresponding displays 30 and 32 of the unit 8 to graphically display indications of the quantity and sense of corrective steering actions to maintain a vehicle 85 on the desired path PP.

Figure 9:
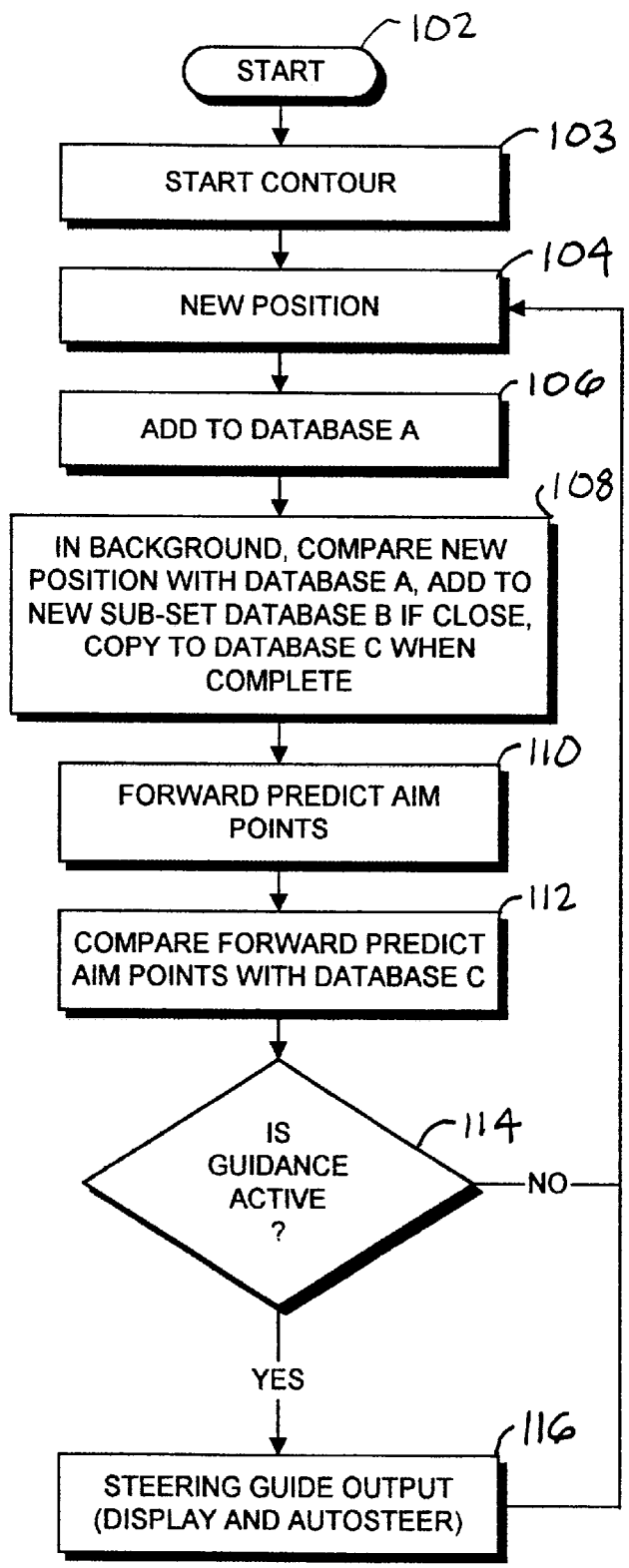
FIG. 9 is a flowchart of a navigational method of the present invention.

FIG. 9 is a flowchart showing an example of a methodology that can be utilized with the controller 2 for managing GPS data in conjunction with automatic steering. From start 102, the method proceeds to start contour mode of operation at 103 and new positions are obtained at 104 by driving the vehicle. GPS data is gathered and downloaded into a master or comprehensive database A at 106, generally comprising the GPS data (coordinates) for the entire area (e.g., a field) covered in a particular session. At 108 the database A is continuously scanned in the background and a subset representing GPS coordinates close to the current vehicle position, biased in the direction of travel, is generated and maintained as database B. Processor utilization is optimized, and its overhead minimized, by assigning the updating of database B a higher priority than updating database A. The database B is updated with sufficient frequency that the vehicle never drives out of the dynamic area defined by the close-proximity GPS coordinates therein. Once database A has been scanned, database B is copied to database C, database B is zeroed, the scanning process is repeated and database C is available for guidance (also at 108).

Left/right look-ahead or aim points are forward-predicted based on vehicle speed and user input corresponding to the distance of the left and right vehicle extremities from the DGPS antenna at 110. The database C, being a subset of A, represents the GPS locations that will be compared to the look-ahead or aim points at 112. The guidance function does not become active (decision box 114) until the processor detects look-ahead or aim points corresponding to close-proximity GPS points in the database C. In other words, guidance is normally inactive during a first swath because all of the logged GPS points are typically behind the vehicle. On a second swath, guidance becomes active as the processor begins to match one or the other of the look-ahead points with corresponding close-proximity points in subset database C. Steering guide output is provided at 126 for display as described above or for the automatic steering mechanism 52.

Updating the look-ahead points and comparing with database C at 112 is the highest priority. A frequency of 5 Hz is generally satisfactory. Updating the proximity database B at 108 is the second-highest priority. The master database A is updated at GPS update rate at 106. By actively comparing the look-ahead points to the data subset C and relegating the updating of B to a lower priority task, processor "overhead" is reduced. Moreover, the respective look-ahead point associated with the respective vehicle side closest to the previous swath is automatically selected and compared to GPS data in C representing the previous swath edge. Thus, efficiency in operating the controller/processor 2 is optimized by examining only subset GPS data in proximity to the current vehicle position, as opposed to the entire set of "previously-covered" GPS data found in C. This allows a full field's worth of swathed data to be managed in real time and all edges checked for closest approach.

Figure 10:
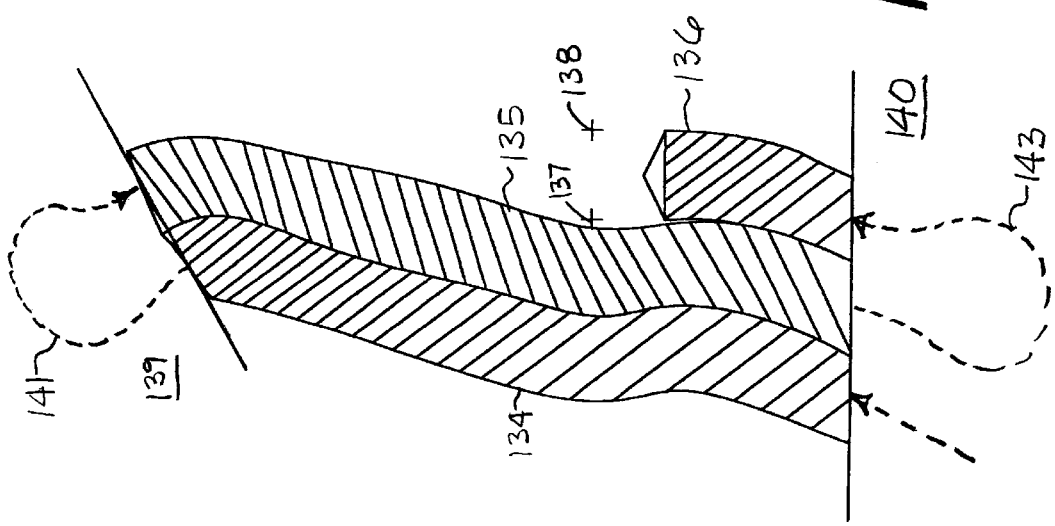
FIG. 10 is an overhead view of a field showing parts of adjacent swaths in contour mode guidance.

FIG. 10 shows guidance in contour mode with previous swaths 134, 135 and a current swath 136. Left and right look-ahead points are defined at 137, 138 respectively. Headlands 139, 140 are shown at the ends of the swaths. The vehicle typically makes 180 degree keyhole-shaped turns, as shown at 141, 143.

Figure 11:
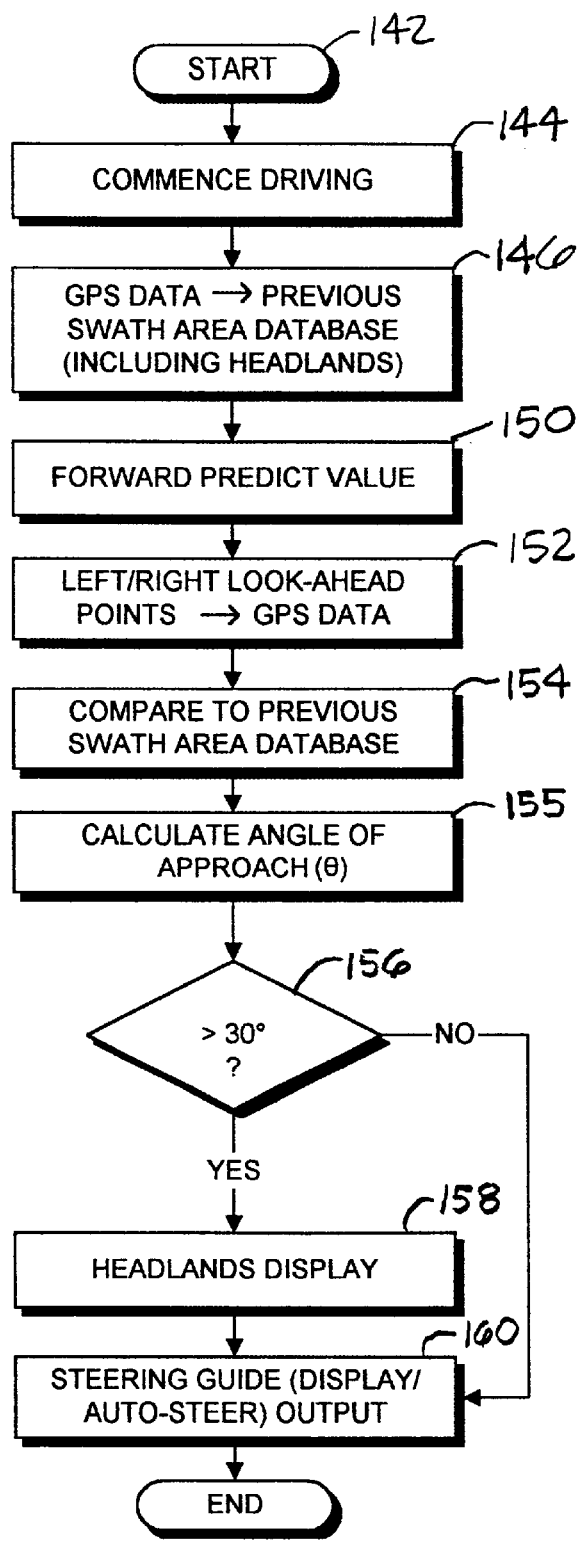
FIG. 11 is a flowchart of a headlands detection method of the present invention.

FIG. 11 shows a headlands detection method, which starts at 142, proceeds to commence driving at 144 and loads GPS data into a previous swath area database at 146. The database includes "headlands", generally representing the turnaround areas for the implement at the ends of the swaths, as shown in FIG. 10. Forward predicted values are determined at 150 and define left/right look-ahead points at 152 for comparison to the previous swath area database at 154. An angle of approach is defined at 155 and represents the angle formed by the current vehicle path with the previously defined area. A relatively large (e.g., greater than 30 degrees) angle represents approaching a headland at the end of a swath (affirmative branch from decision box 156 to headlands display 158. A relatively small (e.g., less than 30 degrees) angle of approach indicates a shallow approach to a previous swath, and the negative branch from decision box 156 leads to steering guide output for display and/or automatic steering at 160.

The headlands display 158 function illuminates both of the headlands indicator LEDs 162 (FIG. 2), which generally indicates that the vehicle has entered a headland (i.e., previously-mapped) area and should turn around. Other responses can be indicated, such as discontinuing spraying or raising an implement, which can be automated in conjunction with the controller/processor 2. Alternatively, illumination of the headlands indicators 162 can result from the operator driving into a previously-worked area at a sufficiently large angle of approach.

Figure 12:
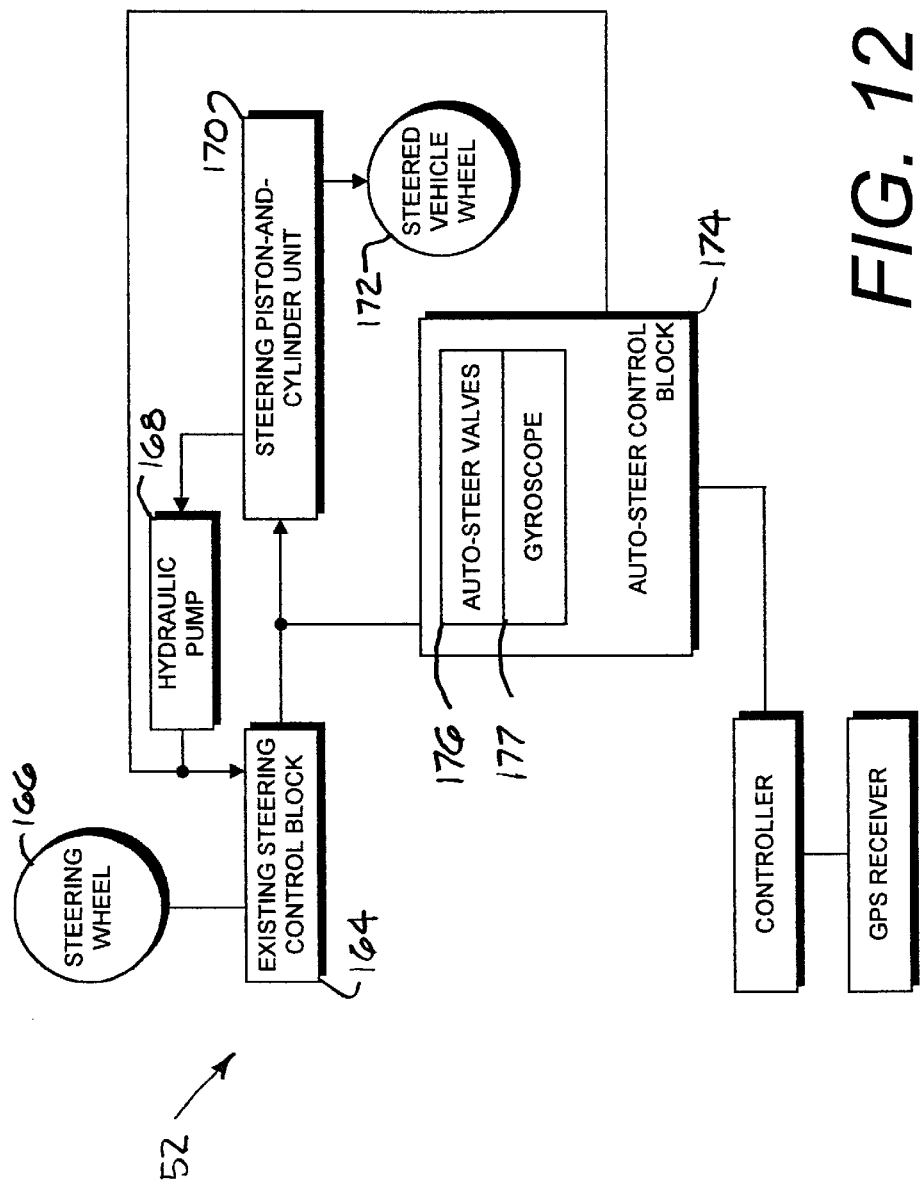
FIG. 12 is a block diagram of an automatic steering assist mechanism of the present invention.

FIG. 12 is a schematic diagram of the automatic steering mechanism 52, shown in conjunction with an existing steering control block 164, which receives inputs from a steering wheel 166. An hydraulic pump 168 provides pressurized hydraulic fluid through the control block 164 to a steering piston-and-cylinder unit 170, which pivots the steered vehicle wheel 172. The controller 2 is operably connected to an auto-steer control block 174, which is associated with auto-steer valves 176 whereby hydraulic fluid flow to the piston-and-cylinder unit 170 is controlled by the controller 2 using, for example, the guidance methodology discussed above. The auto-steer function can operate in conjunction with manual steering, or independently therefrom. For example, the auto steer valves 176 can be on/off (2 position) valves, which provide relatively low pressure inputs to the piston-and-cylinder unit 170. In this configuration, the existing, manual steering controls remain functional and, if necessary, can be used to override the automatic steering mechanism 52. For example, the automatic steering mechanism 52 can operate continuously to maintain the current vehicle swath alongside the previous swath, with the operator manually turning it around at the headlands.

The auto-steer control block 174 further includes a gyroscope 177, which can be connected in a feedback loop with the GPS-based auto-steer control circuitry. For example, GPS-generated steering assistance can be enhanced with the gyroscope 177 as part of feedback to the output steering signals associated with maintaining a course of the vehicle in cooperation with data output by the GPS position detector.

Figure 13:
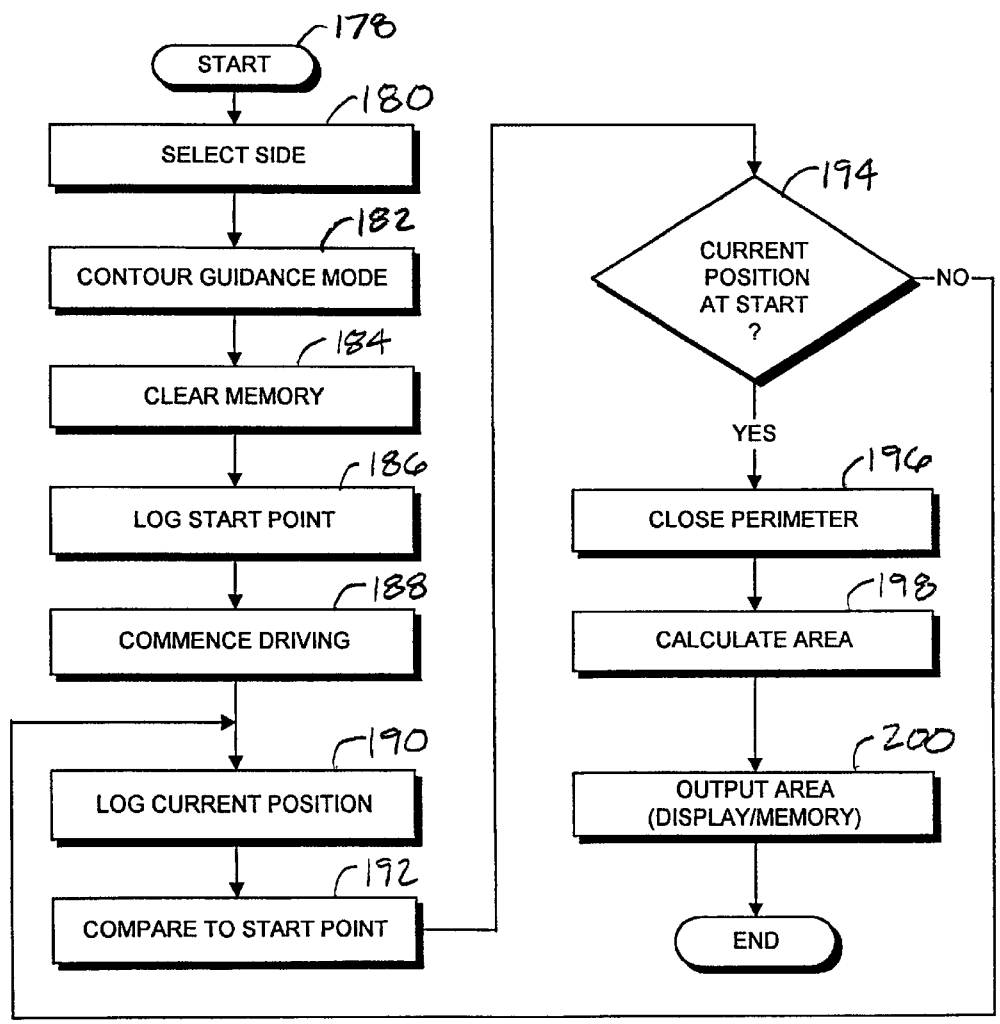
FIG. 13 is a flowchart of an area measurement method of the present invention.

FIG. 13 shows a method of determining an area, which starts at 178 and proceeds to select side at 180, which allows the operator to drive either clockwise or counter-clockwise around the area to be measured. The system is placed in contour guidance mode at 182. Memory is cleared at 184 and a start point is logged at 186. Driving commences at 188, a current position is logged at 190 and compared to the start point at 192. At decision box 194 if the current position is within a predetermined distance of the start point, the perimeter is closed at 196, the area is calculated at 198 and output at 200 to a display as readable text displayed to the operator and/or input to the controller memory. Otherwise, driving around the perimeter continues while current positions are logged. The calculated area value remains available as a menu selection by the controller 2 until cleared at 190. Areas of irregularly-shaped fields can be calculated in the contour guidance mode.

It is to be understood that while certain forms of the present invention have been illustrated and described herein, it is not to be limited to the specific forms or arrangement of parts described and shown.

Having thus described the invention, what is claimed as new and desired to be secured by Letters Patent is:

1. A vehicle navigation system for swathing applications, which system comprises:
   a controller including memory adapted for storing positional data corresponding to an area of swath coverage by said vehicle;
   a position detector for detecting a current position of said vehicle relative to said swath coverage area, said position detector outputting positional data as input to said controller;
   said controller being adapted to compute and output signals corresponding to relative headings of said vehicle from its current position towards said swath area;
   a display subsystem connected to said controller and receiving said heading output signals therefrom; and
   said display subsystem including a heading display with an arcuate or linear directional representation adapted to display a relative heading of said vehicle with respect to said swath area.

2. The navigation system according to claim 1, which includes:
   said directional representation being convex upwardly and/or forwardly with respect to said vehicle and including right and left sides associated with right and left sides of said vehicle respectively.

3. The navigation system according to claim 1 wherein:

said directional representation includes right and left sides associated with right and left sides of said vehicle respectively; and said sides are selectively illuminated in proportion to said relative heading of said vehicle with respect to said swath area.

4. The navigation system according to claim 3, which includes:

said heading display having a centerline representation adapted for illumination in response to an on-course output signal from said controller.

5. The navigation system according to claim 1, which includes:

a previous coverage area detector adapted for detecting the presence of the vehicle in a previously-covered area and outputting a signal indicating same.

6. The navigation system according to claim 5, which includes:

said previous coverage area detector activating in response to an approach angle of said vehicle to a previous coverage area.

7. The navigation system according to claim 6, which includes:

a pair of previous coverage area indicator lights each located at a respective side of the heading display and being adapted for illumination in response to said vehicle entering a previous coverage area.

8. The navigation system according to claim 1, which includes:

a crosstrack error display with right and left sides associated with the right and left sides of said vehicle respectively; and said crosstrack error display sides being selectively illuminated in proportion to a displacement of a current vehicle swath from a previous, adjacent vehicle swath.

9. A navigation system for swathing applications defined by the swath edges of areas previously covered and performed by a vehicle with a user-entered swath width, which system comprises:

a guidance controller including memory adapted for storing positional data corresponding to an area of swath coverage by said vehicle;

a position detector for detecting a current position of said vehicle relative to said swath coverage area, said position detector outputting positional data as input to said guidance controller;

said guidance controller scanning its memory of stored positional data and generating a subset thereof, said subset comprising positional data relatively close to the current vehicle position;

said guidance controller being adapted to compute positions for a pair of look-ahead points relative to swath edges based on said subset data;

said guidance controller providing output for placing the current vehicle swath coverage adjacent a previous swath coverage area;

an automatic steering assistance mechanism mounted on said vehicle and connected a steering system thereof, and said guidance controller being connected to said automatic steering mechanism and controlling same.

10. The navigation system according to claim 9, which includes:

said guidance controller prioritizing computing said look-ahead points over updating said memory of stored positional data.

11. The navigation system according to claim 10 wherein said guidance controller updates said subset data to accommodate movement of said vehicle whereby the current vehicle position is maintained within areas represented by said subset data.

12. The navigation system according to claim 11 wherein said guidance controller prioritizes updating said subset data over updating said memory of stored positional data.

13. The navigation system according to claim 9 wherein said guidance controller output is based on a positional error and a heading error to a point of closest approach on the previous swath coverage area.

14. The navigation system according to claim 9 wherein said automatic steering assistance mechanism includes a gyroscope adapted for maintaining a course of said vehicle in cooperation with said positional data output by said position detector.

15. The navigation system according to claim 14 wherein said gyroscope is connected to a feedback circuit providing correctional signals to said guidance controller.

16. The navigation system according to claim 15 wherein said guidance controller uses GPS data for guidance with correction by said gyroscope.

17. The navigation system according to claim 9, which includes:

said vehicle having an hydraulic steering system; and said automatic steering assistance mechanism including an hydraulic valve mechanism connected to said hydraulic steering system and adapted for applying hydraulic pressure for biasing said steering in a respective direction in response to steering signals from said guidance controller.

18. The navigation system according to claim 17, which includes:

said hydraulic valve mechanism comprising a pair of hydraulic valves each having open and closed positions and each associated with a respective steering direction; and said automatic steering assistance mechanism selectively opening one of said valves to bias said steering piston-and-cylinder unit in a respective direction.

19. The navigation system according to claim 9, which includes:

said guidance controller being adapted to compute and output signals corresponding to a crosstrack error of said current vehicle position with respect to a previous swath; and a display subsystem connected to said guidance controller and including a lightbar with opposite sides each adapted for proportional illumination representing a right or left condition and a magnitude of said crosstrack error.

20. The navigation system according to claim 9, which includes:

said guidance controller being adapted to compute and output signals corresponding to relative headings of said vehicle from its current position towards said swath area;

a display subsystem connected to said guidance controller and receiving said heading output signals therefrom;

said display subsystem including a heading display with an arcuate or linear directional representation adapted to display a relative heading of said vehicle with respect to said swath area.

21. The navigation system according to claim 20 wherein said heading display includes opposite sides corresponding to the right and left sides of the vehicle and each said heading display side is adapted for proportional illumination corresponding to a steering angle towards the edge of a previous swath.

22. The navigation system according claim 9, which includes an area measurement system adapted for identifying a perimeter start point, logging positional data around the perimeter of an area to be measured, detecting proximity to the start point, closing the perimeter, calculating the area and outputting same.

23. A vehicle navigation system for swathing applications, which system comprises:

a controller including memory adapted for storing positional data corresponding to an area of swath coverage by said vehicle;

a position detector for detecting a current position of said vehicle relative to said swath coverage area, said position detector outputting positional data as input to said controller;

said controller being adapted to compute and output signals corresponding to relative headings of said vehicle from its current position towards said swath area;

a display subsystem connected to said controller and receiving said heading output signals therefrom;

said display subsystem including a heading display with an arcuate or linear directional representation adapted to display a relative heading of said vehicle with respect to said swath area;

an automatic steering assistance mechanism mounted on said vehicle and connected to a steering system thereof; and said guidance controller being connected to said automatic steering mechanism and controlling same.

* * * * *